United States Patent [19]

Hatchett et al.

[11] Patent Number: 5,029,029
[45] Date of Patent: Jul. 2, 1991

[54] LINEAR ACTUATOR WITH REDUCED WEAR GUIDE WAY

[75] Inventors: Michael R. Hatchett, Eastleigh; Anthony R. Hearn; John S. Heath, both of Winchester; Charles M. Lacey, Emsworth, all of England; Thaddeus L. Larek; John R. Reidenbach; Clarence R. Schwieters, all of Rochester, Minn.

[73] Assignee: International Business Machines Corporation, Armonk, N.Y.

[21] Appl. No.: 617,479

[22] Filed: Nov. 16, 1990

Related U.S. Application Data

[63] Continuation of Ser. No. 324,261, Mar. 15, 1989, abandoned.

[51] Int. Cl.⁵ .......................... G11B 5/55; G11B 21/08
[52] U.S. Cl. .................................................... 360/106

[58] Field of Search ......................................... 360/106
[56] References Cited

U.S. PATENT DOCUMENTS 4,864,447 9/1989 Takekado et al. ................... 360/106

FOREIGN PATENT DOCUMENTS 63-81369 5/1988 Japan .

Primary Examiner—Robert S. Tupper
Attorney, Agent, or Firm—Richard E. Billion

[57] ABSTRACT

A linear actuator for positioning the heads of a disk file relative to tracks on the disks employs a ceramic material having wear properties superior to steel in guide surfaces for guiding a head supporting carriage running on rotary bearings in contact with the guide surfaces. The preferred ceramic material is tetragonally stabilized zirconia.

13 Claims, 4 Drawing Sheets

FIG. I

LINEAR ACTUATOR WITH REDUCED WEAR GUIDE WAY

This is a continuation of Ser. No. 07/324,261 filed Mar. 15, 1989, abandoned.

BACKGROUND OF THE INVENTION

This invention relates to linear actuators for positioning the heads of disk files.

Transducing heads for reading information from and writing information on the information storage disks of a disk file must be accurately positioned over selected concentric information bearing tracks on the disk surface. Various types of actuator have been employed to position the heads of which the most common is the linear voice coil actuator.

This comprises a coil which is situated in a annular air gap in a magnet assembly such that energization of the coil causes it to move linearly along the air gap. The coil is connected to and supported by a carriage which also supports the heads. The carriage runs on guide ways or surfaces which constrain it to move in a linear path radially of the disks.

A recent example of such an actuator can be found in U.S. Pat. No. 4,661,729. In that patent the guide ways are horizontally spaced parallel rods between which the carriage runs on three pairs of outrigger bearings. The conventional material for such guide rods is steel and an example of another such actuator in which steel is specified as the guide rod material is described in published European patent application EP 0223610 A2.

The use of magnetic steels to form guide rods has been recognized to have potential disadvantages in the case of voice coil actuators since their magnetization by the voice coil magnet assembly can affect actuator performance by causing the carriage bearings, if also magnetic, to 'cog' or run unevenly. In the case of magnetic disk files, the prior art has also recognized the problem that magnetic guide rods may also offer a leakage path for magnetic flux to the neighborhood of the disks, thus affecting the read and write process. One solution to these problems is the use of non-magnetic stainless steel guide rods and a linear VCM employing such guide rods is described in U.S. Pat. No. 4,247,794.

The use of non-magnetic guide rails or bearings is also mentioned in an article by K. A. Mawla (IBM Technical Disclosure Bulletin, Vol. 28 No. 10, March 1986, p. 4479) entitled 'Magnetic shunts to shield the bearings and rails of a voice coil motor actuator in a magnetic recording disk file', as a possible alternative to the use of such shunts.

An article entitled 'Composite center core for reduction of stray magnetic fields in disk file actuators' by J. Cocke et al. (IBM Technical Disclosure Bulletin Vo. 28, No. 5, Oct. 1985, p. 1889) suggests a guide rod center core comprising a non-magnetic rod, such as stainless steel, soldered to a magnetic rod within the actuator stator.

A further problem with guide ways for linear actuators which is not discussed in the above referenced art is that of wear. Although the use of flat guide ways is known to reduce wear by spreading the load of the bearings, this requires precision alignment of the bearings with the flat guide surface which is difficult and costly to achieve. Thus in most recent disk files, round ways are preferred.

Wear of the carriage guide way surfaces, whether flat or round, can lead to tilting of the carriage in the direction of motion and consequent non-linear radial movement of the magnetic heads on the disk surfaces. Although such displacements can be accommodated to a limited extent by the head positioning servo system, the misregistration may exceed the limits that the servo can follow and, in any case, will limit the attainable track density.

The problem of tilt in linear actuator systems becomes more acute with smaller form factor disk files. This is because the wheelbase of the carriage is reduced and, by the principle of levers, the movement of the heads resulting from a small displacement of one of the bearings will be amplified.

Another aspect of wear which is particularly critical in disk files is that it is a source of particulate debris which can cause failure of the heads/disk interface where separations of 0.3 are typical.

As well as their better known uses as refractory or electrical insulating materials, ceramics such as zirconia have been proposed for a number of engineering applications involving wear under light loads or hot conditions. A number of such applications, as well as a general review of zirconia, are discussed in 'An introduction to zirconia' by R. Stevens (Magnesium Elektron Ltd., 1986).

In a recent U.S. Pat. No. 4,709,284, zirconia is suggested as a material for the air bearing slider of a magnetic head because of its good sliding properties, abrasion resistance, high machinability and resistance to static electrical charging.

SUMMARY OF THE INVENTION

Accordingly, it is an object of the invention to provide a linear actuator with reduced guide way wear.

It is a further object of the invention to reduce the adverse effects of magnetic fields on linear voice coil actuators and magnetic disk files.

Both objects are achieved according to the present invention by providing a linear actuator for positioning the heads of a disk file relative to tracks on the disks in which a ceramic material having superior wear properties to steel is used for guide surfaces employed to guide a head supporting carriage running on rotary bearings in contact with the guide surfaces.

Not all ceramics are satisfactory and also some show only modest improvements in comparison with steel. Adequate hardness, fracture toughness, flexural strength and resistance to grain pull out are required. Also machinability to a fine enough surface finish is necessary.

Zirconia has proved to be the best ceramic material for this purpose particularly when in its tetragonally stabilized form and with a grain size not exceeding 0.5 $\mu$m. Yttria is the preferred stabilizing agent at a 3% molar concentration.

It is preferred that the guide means comprising the guide surfaces should be two solid round rods of zirconia. In the case of a voice coil actuator such rods can conveniently be supported along their entire length by part cylindrical grooves in the split inner core pieces of the magnetic stator assembly and by circular apertures formed in the end plates of the stator assembly.

Actuators according to the invention have been found to exhibit lower wear than comparable steel guide surfaces so that tilting of the head support carriage on its wheelbase during the life of the product is minimized. This enables smaller disk files to be built with increased track density as the offset of the heads from the tracks due to tilting can be kept within the ability of the head positioning servo to follow. It also allows the ratio of head stack height to wheelbase to be increased. Nor has such wear as has occurred resulted in unacceptable particulate debris being generated.

Further, in magnetic disk files, any magnetic problems associated with proximity of the rods to the disks can be avoided by the use of ceramic material while permitting the rods to pass right through the innermost end plate of a VCM stator assembly. Such an arrangement gives maximum support to the rod and helps to facilitate the design of a more compact actuator. Additionally, cogging of magnetic steel bearings which also contributes to a non-linear response of a linear actuator is also avoided by the choice of the non-magnetic ceramic material.

Ceramic rails have also been found to be advantageous, in some circumstances, in isolating the magnetic heads and carriage of a disk file electrically from the remaining mechanical structure.

DETAILED DESCRIPTION

Figure 1:
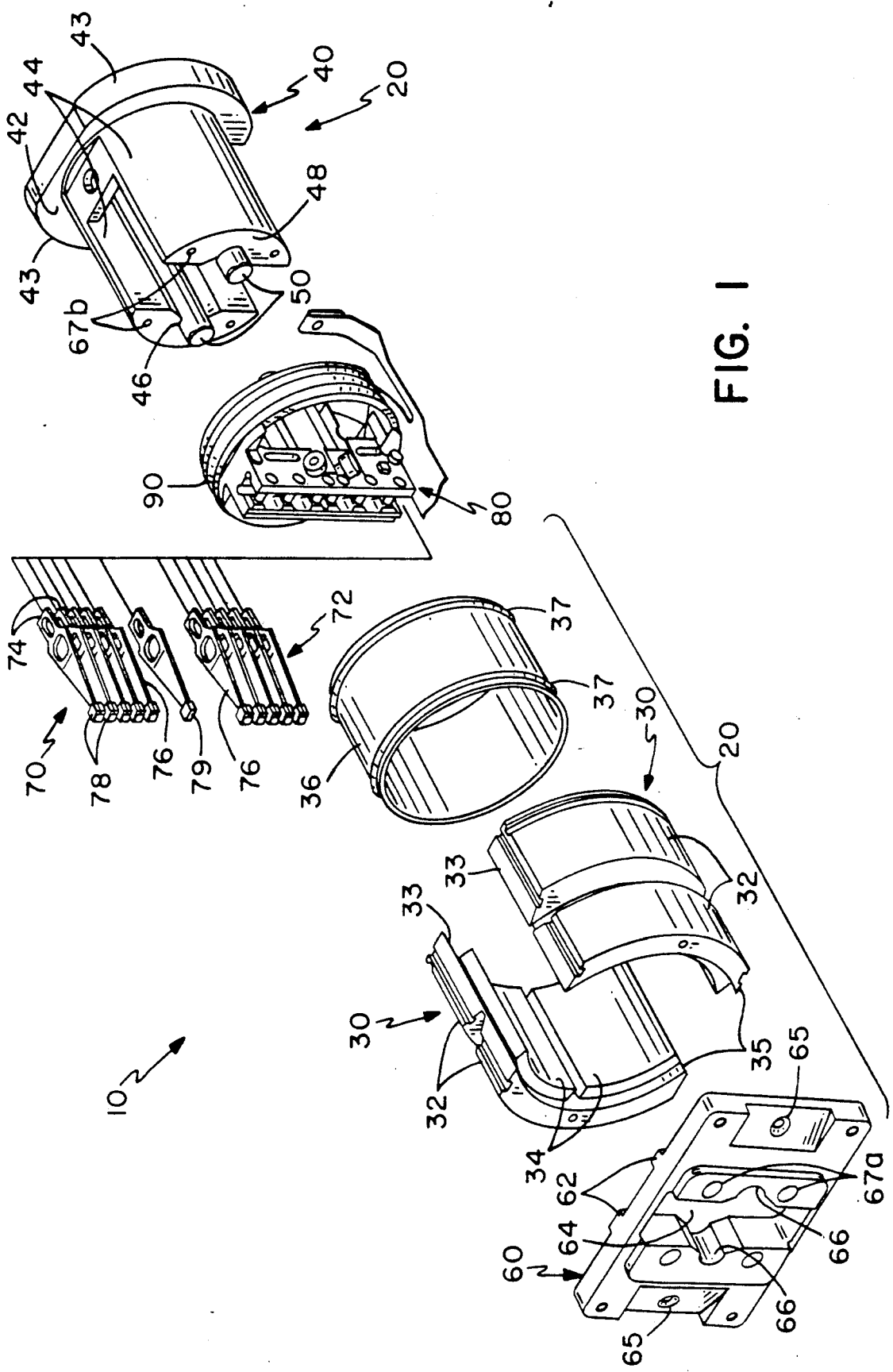
FIG. 1 is an exploded view of a linear actuator assembly for positioning the heads of a disk file.

The constituent parts of the actuator assembly 10, which is of the voice coil motor type, are shown in FIG. 1. These include a fixed magnet subassembly 20 and a movable carriage assembly 80 supporting a head stack 70. In operation of this type of actuator, a signal in the form of a current is supplied to the coil, the current interacts with the magnetic field set up by the magnet subassembly causing movement of the coil and therefore of the head stack.

The magnet subassembly 20 includes two outer core structures 30 which are formed from four pole pieces 32 with concave inner surfaces which are mounted in pairs on, and bonded to, the convex outer surfaces of two magnetic segments 34. The pole pieces overlap the magnet segments at the front and back. The magnet subassembly also includes a conductive, non-magnetic cylinder 36, which acts as a shorted turn.

The magnet subassembly further includes an iron inner core 40 which is cast in one piece and includes a backing plate 42 substantially circular in cross section with two flat portions to the top and bottom. Projecting from the backing plate are tow arms 44 with outer surfaces of substantially the same curvature as the inner surfaces of the magnet segments. The inner surface of each of the arms incorporates a cylindrical groove 46, the grooves running along the length of the arms in parallel relationship. Cylindrical zirconia guide rails 50 are adhesive bonded into these grooves, such that the front ends of the guide rails extend beyond the front face 48 of the inner core.

The magnet subassembly further includes a front plate 60 which functions as a magnetic flux return path, in the same way as the backing plate of the inner core. Incorporated on the back face of the front plate are curved features 62, with essentially the same curvature as the inner surfaces of the outer core pieces. The front plate also includes an aperture 64 which incorporates two cylindrical grooves 66 corresponding to the grooves in the inner core.

The head stack 70 is shown in FIG. 1 and consists of ten head/arm assemblies 72 which comprise a rigid arm portion 74 to which is attached two flexures 76 biased away from one another. A slider 78 incorporating a magnetic read/write head is attached to each of the flexures. Also included in the head stack is a head/arm assembly comprising a rigid arm portion to which is attached one end of a flexure. A servo head 79 is attached to the other end of the flexurre.

Figure 2:
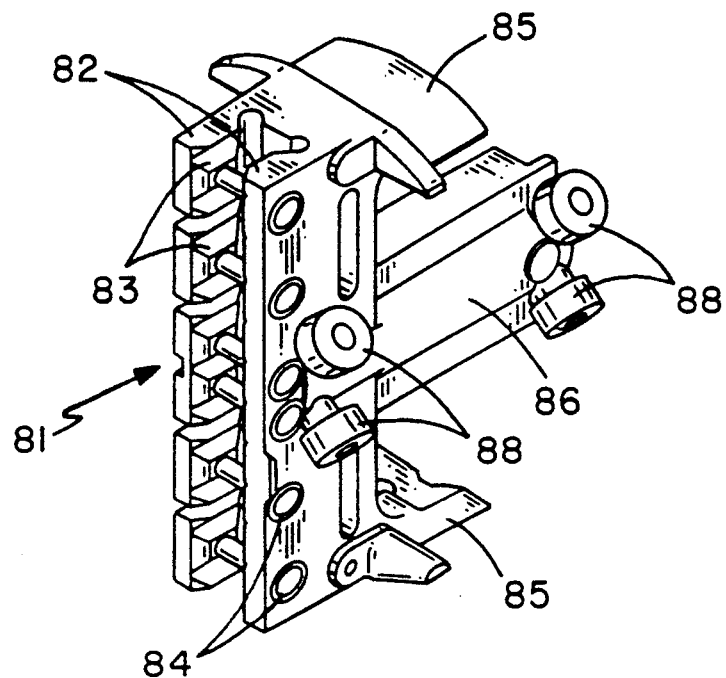
FIG. 2 is an isometric front view of the carriage subassembly employed in the actuator assembly of FIG. 1.
Figure 3:
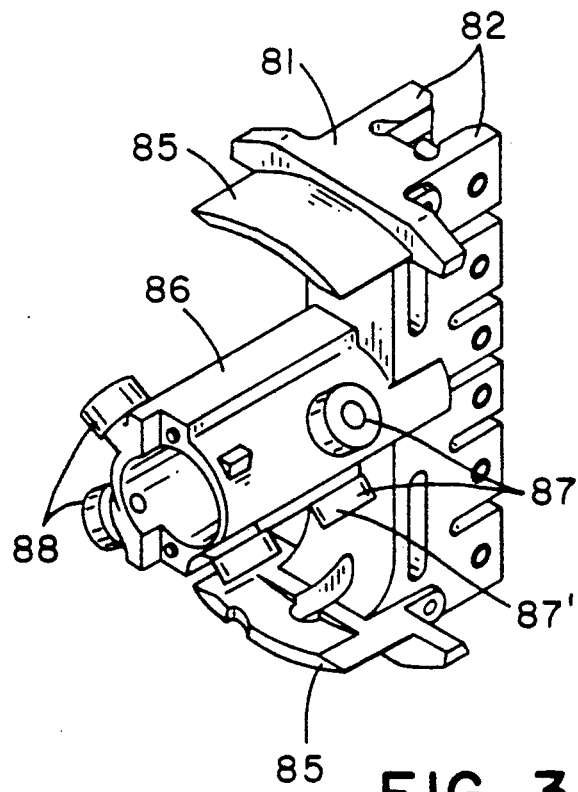
FIG. 3 is an isometric rear view of the carriage subassembly of FIG. 2.

The carriage subassembly 80 is also shown in FIG. 1 and in greater detail in FIGS. 2 and 3. It includes a vertical member 81 including two side walls 82 into which are located a plurality of slots 83. The rigid arm portions of the head arm assemblies are secured in the slots in parallel spaced apart relationship by means of clamping bolts 84 passing through the two side walls of the vertical member. The carriage subassembly further includes extensions from the top and bottom of the vertical member in the form of two curved segments 85 onto which the voice coil 90 is wound (see FIG. 1), and a horizontal member 86 extending from the center of the vertical member.

Six steel bearings are rotatably mounted in canted pairs onto the carriage subassembly. One pair 87 is positioned on one side of the horizontal member and the two remaining pairs 88 are positioned symmetrically about the single pair such that the forward pair is located on one of the side walls of the vertical member.

Figure 4:
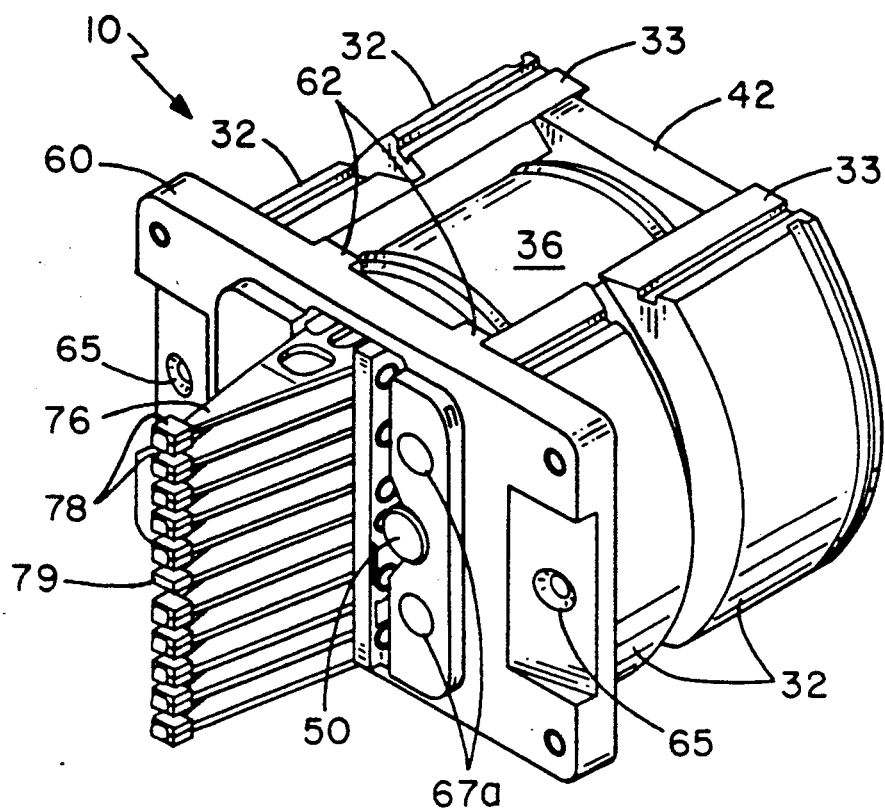
FIG. 4 is an isometric view of the assembled actuator assembly of FIG. 1.

The assembled actuator is shown in FIG. 4. In the assembled actuator, the tail ends 33 of the pole pieces 32, which extend beyond the magnet segments 34, are in abutting relationship with the curved outer surfaces 43 of the backing plate 42. The forward extensions 35 located on the curved features 62 on the back face of the front plate and are fixed in place by means of two bolts which pass through two holes 65 in the front plate. The conductive, non-magnetic cylinder 36 is positioned in the magnetic circuit in close proximity to the inner surfaces of the magnetic portions. The shorted turn is supported away from the magnet segments by means of two 'O' rings 37.

The shorted turn can be seen in FIG. 4, through the opening defined by the outer core pieces. An air gap 39, annular in cross section, is defined between the inner surface of the shorted turn and the outer surfaces of the arms of the inner core.

Figure 6:
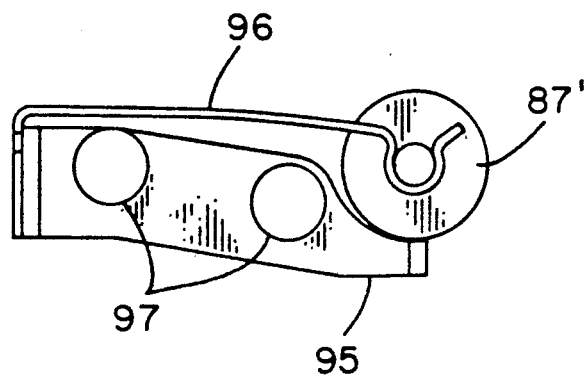
FIG. 6 is a side view of the preload spring employed in the carriage subassembly of FIG. 5.
Figure 5:
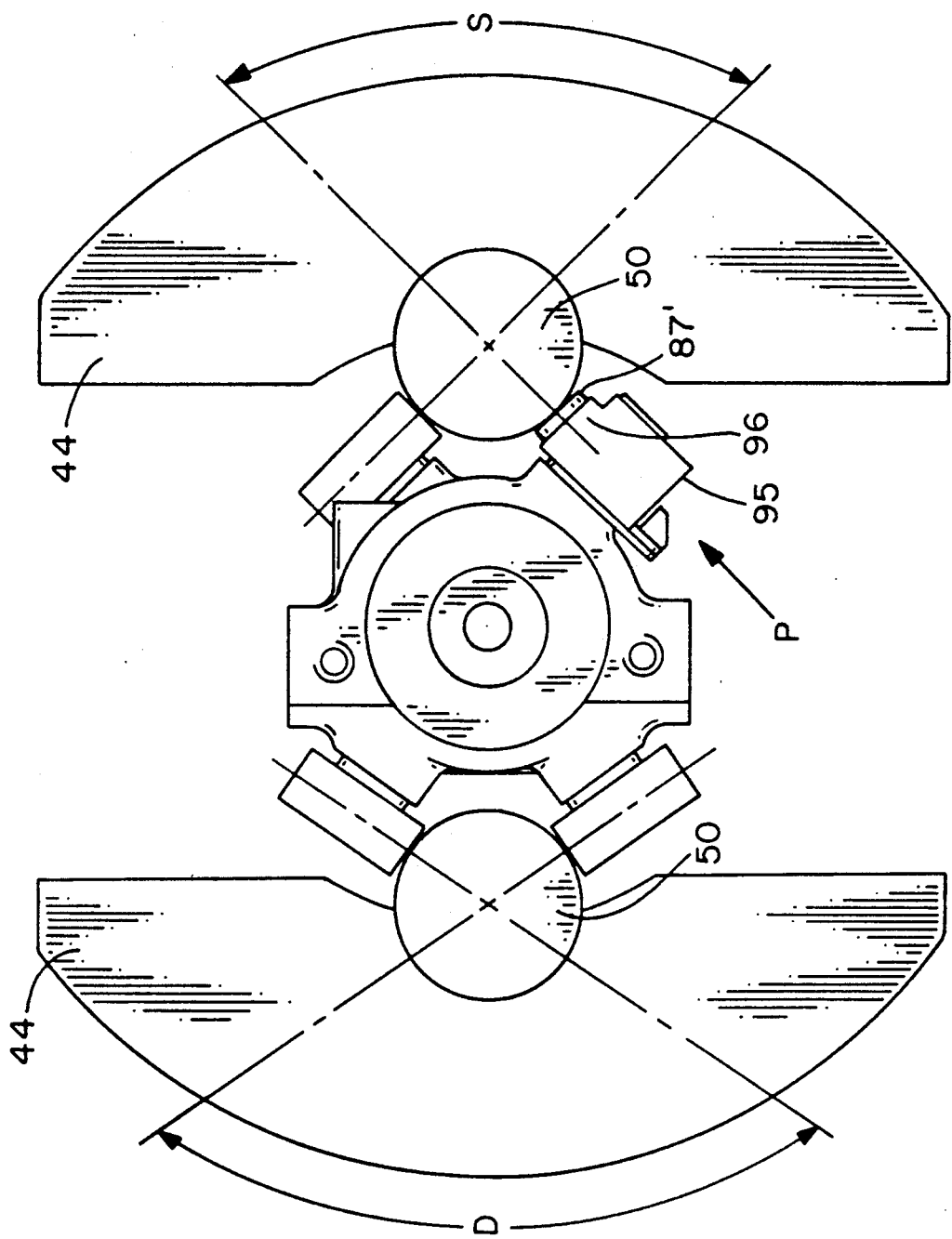
FIG. 5 is a schematic rear view of part of the carriage subassembly showing detail of the bearing geometry.

The carriage subassembly fits within the magnet subassembly in such a way that the coil 90 wound on the carriage locates in the air gap defined between the shorted turn and the inner core. The bearings 87,88 mounted on the carriage engage with the two guide rails 50 fixed in the inner core thereby allowing movement in a direction parallel to the rails. The lower of the bearings 87' of the single pair is held in a supporting unit 95 by means of a spring 96 mounted on the unit (FIGS. 5 and 6). The unit is fixed to the side of the horizontal member of the carriage subassembly by two pins 97.

The bearing is biased towards, and therefore applies a preload to, the guide rail. In this way the carriage subassembly is loaded onto the guide rails thereby removing any radial play in the bearing and between the carriage and the rails.

The front plate is secured to the arm portions of the inner core by means of screws which pass through four holes 67a in the front plate and into four equivalent holes 67b, two in each of the arms. The front ends of the guide rails locate in the grooves in the front plate. The head stack 70 attached to the carriage subassembly extends forwards through the aperture in the front plate.

Also incorporated in the actuator (but not shown in the figures) are appropriate means for limiting the extent of longitudinal travel of the carriage subassembly and also a latch for holding the carriage in a fixed position when not in use.

A schematic rear view of part of the carriage subassembly showing the geometry of the bearing configuration is shown in FIG. 5. The single pair of bearings 87 is on the right and one of the other two pairs 88 is on the left. The angle between the bearings of the single pair is different to that between the bearings of the other two pairs.

The values of the angles are chosen primarily to reduce the load imbalance described above. Analysis of the bearing geometry in FIG. 5 shows that the load imbalance may be reduced by setting the angle of the single pair lower than that of the dual pair. With reference to FIG. 5; the angle between the bearings of the single pair to be S and the angle between the bearings of the other two pairs to be D. Then with a preload of P on the lower of the single pair bearings 87', each bearing on each of the other two pairs will see a load Pd, where:

$$Pd = (P \times \cos(S/2))/(2 \times \cos(D/2))$$

i.e. if S=D then the load on each of the bearings of the other two pairs Pd=P/2. However if, for example, the angle between the bearings of the single pair, S, is 60 degrees and the angle between the bearings of the other two pairs, D, is 100 degrees then the load on each of the two pair bearings, Pd, is 0.67 P.

Thus, by choosing the appropriate angle values, it is possible to reduce the load imbalance. Therefore, the amount of preload on the single pair bearing required to avoid bearing slippage of the bearings of the other two pairs is reduced. This reduces friction between the bearings and supporting guide rail with a resultant reduction in wear of the bearings and the supporting guide rail.

Variation of the bearing angles has also been found to be useful in another aspect of the actuator assembly design. In the actuator assembly described, the carriage is made of light material such as magnesium or aluminium. This expands and contracts more than the material making up the rest of the actuator. In addition, there is a one sided preload system which tends to bias all changes in dimension to one direction. This differential thermal expansion can therefore be a cause of rotation of the carriage assembly about the preload point. Analysis of this effect shows that by careful choice of the bearing angles, a compensated arrangement can be designed. However, the choice of angle also depends on load constraints (as described above). For this actuator assembly, compromise angles which achieve good load characteristics and which compensate for effects due to differential thermal expansion are calculated at S=90 degrees and D=110 degrees.

The linear actuator 10 disclosed for positioning the heads of a disk file relative to the tracks on the disk employs a ceramic material having wear properties superior to steel in the guide surfaces 50 for guiding the head supporting carriage 80 running on rotary bearings 87, 88 which are in contact with the guide surfaces. The guide rails or surfaces 50 are adhesive bonded into the cylindrical grooves 46, such that the front ends of the guide rails or surfaces extend beyond the front face 48 of the inner core. The preferred ceramic material is tetragonally stabilized zirconia.

The zirconia material used for the rails 50 is a tetragonally stabilized zirconia supplied by Kyocera Corporation (Material Code No. Z201N). This has been found to consist almost exclusively of zirconia in its tetragonal crystalline phase and to have negligible proportions of cubic or monoclinic crystals.

The tetragonal phase of zirconia is metastable and tends to revert to the monoclinic form below a certain temperature unless stabilized by a stabilizing agent. In the present case, the stabilizing agent is yttria at 3% molar concentration.

The grain size of the material of rails 50 is below an average size 0.5 $\mu$m. The surface finish of the rods which are lapped and polished, is better than 0.1 $\mu$m roughness average and 0.3 $\mu$m peak-to-peak.

Although the explanation for the superior wear properties of this zirconia in the linear actuator application is not fully understood, the above parameters are believed to be the key. Also important are hardness exceeding 12.0 GPa, measured by Vickers 500 g hardness test, fracture toughness exceeding 6 MPa m$^{\frac{1}{2}}$, and flexural strength exceeding 950 MPa at 20° C.

The following comparative wear tests have been conducted on actuators using various types of zirconia and other guide rod materials in actuators similar to that illustrated in FIGS. 1–6.

TEST 1—STEEL

An actuator employing carbon chrome steel guide rods and steel bearings was exercised for $10^7$ access movements of the carriage. The bearing preload was 200 gms. The bearings were aligned only by the carriage and rail geometry. Wear pits developed at the ends of the stroke which were about 2$\mu$m in depth, as measured by a profile measuring instrument. In comparison, the desired surface roughness for the rails is 0.1 $\mu$m average (0.3 $\mu$m peak-to-peak).

TEST 2—ALUMINIA

Three actuators similar to the type illustrated in FIGS. 1–6 but alumina rails from two different sources were tested for a period of three weeks (equivalent to about $1.5 \times 10^7$ access movements). All the rails failed with gross wear of more than 5 $\mu$m. Severe particle generation and large deposits of black powder were noted on the rails, proving to be a mixture of alumina and chrome steel.

TEST 3—PARTIALLY STABILIZED ZIRCONIA (PSZ)

Three Actuators with PSZ guide rails containing a mixture of cubic, monoclinic and tetragonal phases of grain size between 2 and 3 $\mu$m average diameter, supplied by Morgan Matroc, Type Z800 were subjected to $2.5 \times 10^8$ access motions under the nominal bearing preload of 200 gm. The tests were carried out at 40° C. and in ambient humidity.

The eighteen wear tracks were examined and six were found to be over 1μ, in depth, ranging from 1.2 to 4.5 μm. In combination with measurements of bearing wear, worst case radial offsets of the extreme data heads relative to the servo head for the three actuators were calculated to be 19, 35 and 116 micro inches (0.5, 1.0 and 4.5 μm) which was unacceptable for this particular product design, although better than steel.

TEST 4—TETRAGONALLY STABILIZED ZIRCONIA (TSZ)

Seven actuators similar to the type illustrated in FIGS. 1 to 6 were assembled with tetragonally stabilized zirconia (TSZ) guide rails. The TSZ rails were supplied by Kyocera Corporation (Material No. Z201N) and were lapped and polished to an average surface roughness of 0.1 μm. Steel bearings supplied by NSK Corporation 7 ball type were employed as carriage bearings. The bearings were not individually aligned over and above the alignment resulting from carriage and rail geometry.

Three actuators had bearings subject to the nominal preload of 200 gm and the remaining four were subjected to preloads of 286, 360, 400 and 662 gm. The actuators were subjected to $5 \times 10^8$ accesses (half the expected number during product life).

The guide rails were examined visually for wear but tracks were only visible for three out of the 42 bearings on the more heavily loaded actuators. The results were:

| Preload | Scar depth |
| --- | --- |
| Actuator 6 400 gm | 0.4 μm |
| Actuator 7 660 gm | 0.32 μm |
| Actuator 7 660 gm | 0.67 μm |

This is comparable with the nominal peak to peak surface roughness specification of 0.3 μm. In no case, was wear greater than 1 μm observed and no wear was observable where nominal preload was used.

The combined effect of rail and bearing wear on radial offset of the extreme heads from the middle (servo) head was calculated to be in the range 0.05 to 0.55 μm.

TEST 5—TETRAGONALLY STABILIZED ZIRCONIA

Seventeen actuators employing the same type of rails and improved 9-ball bearings (supplied by NSK) as for Test 4 were run for a total of $0.33 \times 10^8$ accesses. The bearing preload was 200 gms for all but three actuators where loads up to 500 gms were employed in all cases. The actuators were tested in a temperature range of 40°–60° C. and at up to 90% humidity. Measurements of both rail and bearing were made and converted by calculations to average and worst case sigma radial offsets. The average sigma radial offset was 4.3 μ‘ (0.1μm) and the worst case sigma radial offset was 8.8 μ‘ (0.2 μm). These were well within required limits.

As a result of the above tests and further laboratory examination of the rails, it was tentatively concluded that inter-granular strength is crucial to the wear mechanism as this determines the likelihood of grain pull-out. Once grain pull out occurs, the relatively sharp edges of the wear pits are likely to cause accelerated wear of the bearings which in turn will increase the wear of the rails leading to rapid failure. The inter-granular strength of alumina is only of the order of 2–4 kN as compared with a strength of 10.20 kN for the zirconia material used in Tests 4 and 5.

Although the PSZ tested was found unsuitable for the particular actuator of FIGS. 1-6, it has proved acceptable in experiments carried out with an actuator similar to that shown in U.S. Pat. No. 4,661,729.

Although only a voice coil actuator has been described, the invention is not restricted to this type of actuator. Linear actuators for disk files are known in which the carriage is driven by an electric motor pinion connected to a head carriage by a steel band. Nor is the invention limited to the type of voice coil actuator in which the voice coil is mounted directly on the carriage, as detachable couplings are known in the art. The load on the bearings need not necessarily be applied to the bearings but could, instead, be applied to the guide rails in some designs. Further, in some voice coil actuators, the guide surface may be part of the moving carriage assembly and the bearings may be fixedly mounted in the surrounding stator.

We claim:

1. A linear actuator for positioning the heads of a disk file relative to tracks on the disk comprising:
   a prime mover responsive to the application of power to said actuator to undergo a displacement;
   a carriage for supporting a stack of head/arm assemblies in cantilever fashion and coupled to said prime mover for movement in a linear access direction in response to displacement of said prime mover;
   a plurality of linearly displaced rotary bearings supporting said carriage for linear movement in said access direction to position the heads relative to tracks on the disks;
   guide means for guiding said carriage for movement in said linear access direction having guide surfaces extending linearly parallel to said access direction; and
   loading means for loading said bearings into contact with respective ones of said guide surfaces;
   wherein said guide surfaces are made of zirconia.

2. A linear actuator according to claim 1 wherein said ceramic material is partially stabilized zirconia.

3. A linear actuator as claimed in claim 1 in which said guide means comprises two parallel round guide rods whose curved surfaces constitute said at least two guide surfaces, and said plurality of bearings comprise at least three canted pairs of bearings, the bearings of each pair of bearings being arranged to run along respective circumferentially spaced portions of a respective guide rod and at least two pairs of bearings being linearly displaced from each other to run along the same guide rod.

4. A linear actuator as claimed in claim 3 wherein said guide rods are solid rods of zirconia.

5. A linear actuator as claimed in claim 3 wherein said prime mover is a voice coil mounted on said carriage, said actuator further comprising a magnetic stator assembly defining an air gap in which said voice coil is located and producing a magnetic flux across said air gap.

6. A linear actuator as claimed in claim 5 wherein said magnetic stator assembly includes two semi cylindrical inner core pieces, laterally spaced from each other, an outer cylinder surrounding said core pieces to define an annular air gap therebetween and two end plates at opposite ends of said assembly to which said core pieces and said outer cylinder are attached, said core pieces including part cylindrical grooves along their opposed inner faces for receiving and supporting respective ones of said guide rods, said two end plates each having two circular apertures to receive the ends of respective ones of said guide rods, whereby said guide rods are supported along their entire lengths.

7. A linear actuator for positioning the heads of a disk file relative to tracks on the disk comprising:

a prime mover responsive to the application of power to said actuator to undergo a displacement;

a carriage for supporting a stack of head/arm assemblies in cantilever fashion and coupled to said prime mover for movement in a linear access direction in response to displacement of said prime mover;

a plurality of linear displaced rotary bearings supporting said carriage for linear movement in said access direction to position the heads relative to tracks on the disks;

guide means for guiding said carriage for movement in said linear access direction having guide surfaces extending linearly parallel to said access direction; and loading means for loading said bearings into contact with respective ones of said guide surfaces;

wherein said guide surfaces are made of tetragonally stabilized zirconia.

8. A linear actuator according to claim 7 wherein said tetragonally stabilized zirconia has an average grain size not exceeding 0.5 μm.

9. A linear actuator according to claim 7 wherein said tetragonally stabilized zirconia includes yttria at a concentration of 3% molar as a stabilizing agent.

10. A linear actuator as claimed in claim 7 in which said guide means comprises two parallel round guide rods whose curved surfaces constitute said at least two guide surfaces, and said plurality of bearings comprise at least three canted pairs of bearings, the bearings of each pair of bearings being arranged to run along respective circumferentially spaced portions of a respective guide rod and at least two pairs of bearings being linearly displaced from each other to run along the same guide rod.

11. A linear actuator as claimed in claim 10 wherein said guide rods are solid rods or zirconia.

12. A linear actuator as claimed in claim 10 wherein said prime mover is a voice coil mounted on said carriage, said actuator further comprising a magnetic stator assembly defining an air gap in which said voice coil is located and producing a magnetic flux across said air gap.

13. A linear actuator as claimed in claim 12 wherein said magnetic stator assembly includes tow semi cylindrical inner core pieces, laterally spaced from each other, an outer cylinder surrounding said core pieces to define an annular air gap therebetween and two end plates at opposite ends of said assembly to which said core pieces and said outer cylinder are attached, said core pieces including part cylindrical grooves along their opposed inner faces for receiving and supporting respective ones of said guide rods.

said two end plates each having two circular apertures to receive the ends of respective ones of said guide rods, whereby said guide rods are supported along their entire lengths.

* * * * *